Patented Aug. 16, 1932

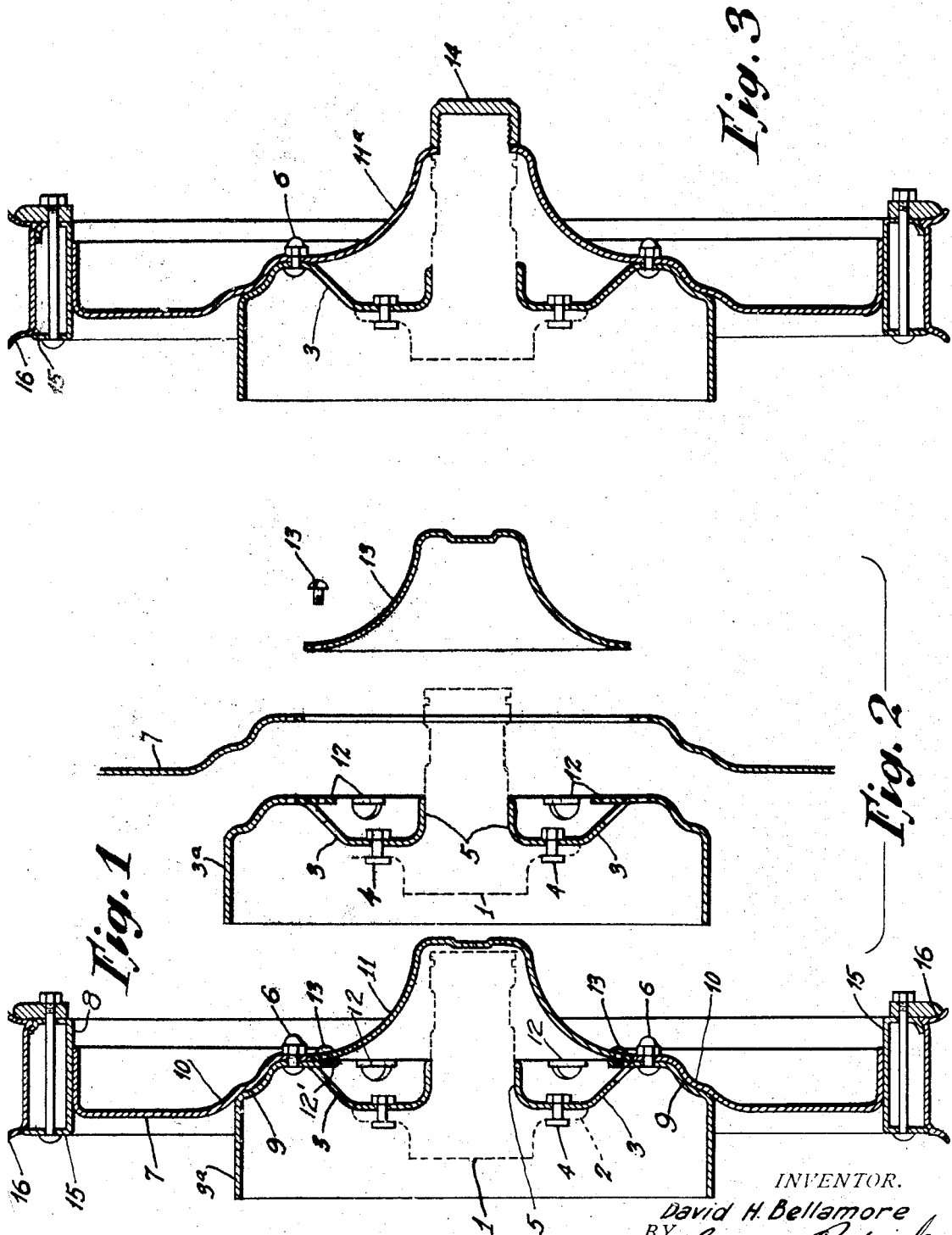

1,872,224

UNITED STATES PATENT OFFICE

DAVID H. BELLAMORE, OF NEW YORK, N. Y., ASSIGNOR, BY MESNE ASSIGNMENTS, TO BENDIX BRAKE COMPANY, OF CHICAGO, ILLINOIS, A CORPORATION OF ILLINOIS

DISK WHEEL

Application filed October 19, 1926. Serial No. 142,611.

This invention is a disk wheel and the object of the invention is to produce an unusually simple, light, durable and serviceable disk wheel and brake drum assembly.

Among the novel features of the construction of the present invention may be mentioned the brake drum which is securely but detachably mounted directly on the hub, while the disk is demountably supported on the brake drum. This permits the disk, with its associated rim and felly, to be demounted intermediate the hub and rim and provides for a relatively light disk. I thus minimize the weight of the normally demountable portion of the wheel and at the same time provide a wheel which is very readily demountable.

Another feature of the invention resides in a novel form of hub housing which covers and conceals the whole, or greater part, of the hub and also extends in an outward radial direction and covers and conceals that portion of the brake drum which is not concealed by the disk. This housing may be so made as to eliminate the necessity of using a hub cap or it may be constructed to be held in place by a hub cap.

The wheel of the invention possesses relatively great strength when constructed from relatively light material. It economizes in cost and weight. The preferred form of wheel of this invention has a smooth exterior or outside surface and, besides presenting a pleasing appearance, is devoid of sharp corners and angles where dirt or mud would be apt to lodge. Accordingly, the wheel may be kept clean and sightly at all times.

Features of the invention, other than those specified, will be apparent from the hereinafter detailed description and claims, when read in conjunction with the accompanying drawing.

The accompanying drawing illustrates different practical embodiments of the invention, but the constructions therein shown are to be understood as illustrative only, and not as defining the limits of the invention.

Figure 1 is a central section of a wheel embodying the present invention showing the parts in assembled relation.

Figure 2 illustrates the manner in which the wheel may be removed from the hub and the brake drum associated therewith; and, Figure 3 is a radial section illustrating a modified form of construction.

Referring to the drawing, and more particularly to Figures 1 and 2, 1 designates a hub which may be of any suitable construction and provided with a fixed flange 2. With the flange 2 of the hub, I associate a brake drum 3, which I secure to the fixed flange 2 in a more or less permanent manner by means of short bolts 4 passed through the hub bolt openings of the flange 2.

The brake drum 3 may be of any suitable shape and may be cast or otherwise formed, but is preferably struck up from heavy gauge sheet metal to form the operative cylindrical portion 3a integral with the remainder of the brake drum. In order that the bolts 4 will not be required to carry all of the load, the drum 3 is preferably provided adjacent its central hub opening with a laterally extending integral flange constituting a tubular sleeve 5, adapted to fit snugly over the hub and come to a seat thereon as clearly shown in the drawing. Near its outer periphery, the drum 3 is perforated to receive attaching bolts 6 by means of which the disk 7 may be secured thereto.

The disk 7 is annular in form and may be of any suitable radial section. It has a suitable tire carrying rim 8 associated with its outer periphery. This tire carrying rim may be of any suitable construction, the showing in Figures 1 and 2 being conventional. As stated, the disk 7 is annular and it is provided, near its inner periphery, with perforations which register with the perforations in the drum 3 to permit the passage of the bolts 6 therethrough. These bolts may be inserted and tightened to bind the disk firmly to the brake drum.

In order that radial thrust may be taken off the bolts 6, the brake drum is preferably flanged inwardly as shown at 9 and the disk is complementarily shaped as shown at 10, so that when the bolts 6 are tightened, the part 10 will engage with the part 9 and come to a tight seal therewith, so that the disk will be held firmly to the drum in such a manner that a strong serviceable construction will result.

The wheel, as thus far described, may be used as a complete construction, but, in practice, I preferably associate therewith a housing 11 to cover and conceal the hub 1 and drum 3. This housing may be constructed to completely cover and conceal both these parts, as shown in Figures 1 and 2, or it may be constituted to cooperate with a hub cap, as shown in Figure 3. In Figures 1 and 2, the housing 11 has an imperforate center and is shaped to extend over the end of the hub with its peripheral portion seated in face abutting relation to the drum 3 to be substantially flush with the disk 7 and form a continuation thereof. To secure the housing 11 in position, I find it convenient to stamp out lugs 12 from the drum 3 and form tapped holes in said lugs. Screws 13 are adapted to pass through alined perforations in the housing and thread into these tapped holes to secure the housing in place independently of the means which secures the disk to the drum. This construction permits the disk to be demounted without removing the housing, and the housing may also be removed without demounting the disk. Moreover, the housing dispenses with the necessity of employing a hub cap.

In the construction of Figure 3, the brake drum 3 is the same as in the construction of Figures 1 and 2, except that it is not provided with lugs 12. The housing 11a in Figure 3, instead of being secured to the brake drum is provided with a perforate center adapted to fit over the threaded end of the hub, so that a hub cap 14 may be screwed on to the threaded end of the hub to force the housing 11a to a seat against the brake drum. If desired, the housing 11a and the hub cap 14 may be made integral, but it is better practice to make these parts separate.

The disk 7 of Figure 3 is secured to the brake drum by bolts 6 in the same manner as hereinbefore described. In Figure 3, I have moreover shown the outer periphery of the disk 7 as secured to a permanent rim or felly 15 with which a demountable rim 16 is associated in the usual manner, so that the wheel of Figure 3 may be either demountable by removing the bolts 6 or the tire alone may be demounted by removing the demountable rim 16.

The wheel of the present invention has many commercial and practical advantages. It will be apparent that in the construction described, weight and cost of construction is minimized, so that a relatively strong and durable wheel is produced with an unusually simple and light construction.

Moreover, a readily demountable wheel is provided which may be used as either a front or rear wheel for four wheel brake cars. It may, however, be employed for the front wheels of two wheel brake cars by simply omitting the cylindrical portion 3a of the brake drum.

In the foregoing detailed description, I have set forth the preferred embodiment of the invention. I am aware, however, that modifications in detail of construction may be made without departing from the spirit of this invention which is to be understood as broadly novel as is commensurate with the appended claims.

Having thus fully described the invention, what I claim as new and desire to secure by Letters Patent is:

1. A disk wheel embodying a hub, a one piece pressed steel brake drum seated upon and carried by the hub, an annular disk, a portion of the inner margin of which is in face abutting relation to the brake drum, a hub and drum concealing housing having its outer marginal portion also in face abutting relation to the drum, said housing serving, together with said disk, to reinforce said pressed steel drum, and means for demountably securing both the disk and the housing to the drum independently of one another whereby either may be demounted from the drum without demounting the other.

2. A disk wheel embodying a hub, a brake drum seated upon and carried by the hub and provided intermediate its inner and outer peripheries with bolt holes, an annular disk provided near its inner periphery with bolt holes registering with the bolt holes in the drum, bolts passed through said holes to demountably mount the disk on the drum and a suitable tire carrying rim associated with the outer periphery of the disk, in combination with lugs formed on the drum inwardly of the inner margin of the disk, a hub and drum concealing housing seated on said lugs with the outer margin of the housing substantially contiguous with the inner margin of the disk, and means for detachably securing the housing to said lugs.

3. A disk wheel embodying a hub provided with a flange, a brake drum secured to the flange and provided at its center with a cylindrical portion embracing the hub and bearing thereon to take up radial thrust, said drum being also provided intermediate its inner and outer peripheries with a shoulder, an annular disk provided at its outer periphery with a tire carrying rim and having near its inner periphery a shoulder adapted to seat upon the shoulder of the drum, means for demountably securing the disk in such seated engagement with the drum, and a housing concealing the hub and that portion of the drum interiorly of the inner periphery of the disk the outer edge of said housing contacting with the inner edge of said disk.

4. A wheel having a hub, a brake drum secured thereto provided with a recess surrounding the hub, a rim-carrying disk seated upon and carried by the drum and provided with an aperture surrounding the hub to expose that portion of the drum adjacent to the hub, and a housing enclosing the end of the hub and having its outer edge in contact with the inner edge of the disk to help carry the load.

5. In a wheel, a hub having a radial flange, a brake drum having a central outwardly-drawn cylindrical flange embracing said hub and being formed with a recess surrounding said hub, and a housing concealing the outer portion of said hub and said recess and secured to said drum radially outwardly from said recess to reinforce said drum.

6. In a wheel, a hub having a radial flange, a brake drum having a central outwardly-drawn cylindrical flange embracing said hub and being formed with a recess surrounding said hub, lugs formed from the walls of said recess and bent outwardly into a substantially radial plane, and a housing concealing the outer portion of said hub and said recess and secured to said lugs to reinforce said drum.

7. In a wheel, a hub having a radial flange, a brake drum having a central outwardly-drawn cylindrical flange embracing said hub and being formed with a recess surrounding said hub, lugs formed from the walls of said recess and bent outwardly into a substantially radial plane, and a housing concealing the outer portion of said hub and said recess and secured to said lugs to reinforce said drum, and a rim-carrying disk seated upon and secured to said drum outwardly of said lugs and having its inner edge in contact with the outer edge of the housing so that said drum and housing take the load from said disk.

In testimony whereof I have signed the foregoing specification.

DAVID H. BELLAMORE.